(12) United States Patent
Jeandemange et al.

(10) Patent No.: US 6,777,044 B1
(45) Date of Patent: Aug. 17, 2004

(54) RESIN COATED FABRIC CONTAINERS AND FURNITURE PANELS AND METHOD OF MAKING THE SAME

(76) Inventors: Eric Daniel Andre Jeandemange, 2212 Amber Rd., Oklahoma City, OK (US) 73170; Philippe Manuel Poma, 2212 Amber Rd., Oklahoma City, OK (US) 73170

( * ) Notice: Subject to any disclaimer, the term of this patent is extended or adjusted under 35 U.S.C. 154(b) by 90 days.

(21) Appl. No.: 10/189,943

(22) Filed: Jul. 2, 2002

(51) Int. Cl.[7] .................. B28B 21/00; B65D 33/28
(52) U.S. Cl. .......... 428/34.5; 224/172; 224/587; 224/42.11; 224/42.13; 224/42.2; 493/328; 493/331; 493/333; 383/71; 383/72; 383/75; 383/77; 383/78; 383/79; 383/127; 442/59; 442/149; 442/150; 428/12; 428/13; 428/34.1; 428/34.3; 428/121; 428/193; 428/196
(58) Field of Search .................. 383/71, 72, 75, 383/77, 78, 79, 127, 902; 493/328, 331, 333; 224/172, 173, 175, 587, 42.11, 42.13, 42.2; 442/59, 149, 150; 428/12, 34.1, 34.3, 34.5, 34.6, 34.7, 35.2, 35.7, 35.8, 35.9, 36.1, 36.2, 36.8, 36.9, 36.41, 121, 124, 125, 193, 194

(56) References Cited

U.S. PATENT DOCUMENTS

| 4,321,756 | A | * | 3/1982 | Mosely ...................... 34/322 |
| 4,405,341 | A |   | 9/1983 | Jaschek |
| 5,158,220 | A | * | 10/1992 | Glass ...................... 224/657 |
| 5,385,164 | A | * | 1/1995 | Sauter ...................... 135/87 |
| 5,433,998 | A |   | 7/1995 | Curzio |
| 5,773,372 | A |   | 6/1998 | Ikeyama |
| 6,037,064 | A |   | 3/2000 | Vicovanu |
| 6,391,380 | B1 |   | 5/2002 | Goldberg |

* cited by examiner

Primary Examiner—Arti R. Singh
(74) Attorney, Agent, or Firm—Randal D. Homburg

(57) ABSTRACT

The invention relates to a coated fabric object and a method of making the coated fabric object, including a vase, container or furniture panel, the object having an outer fabric wrapping with a sewn seam and drawstring to tighten the seam around the neck of the object, an inner fabric collar applied and fitted to the opening of the object, after which a clear resin coating is applied to the fabric, causing the fabric to become stiff as the resin hardens, permanently bonding the fabric to the object to which it is applied.

1 Claim, 2 Drawing Sheets

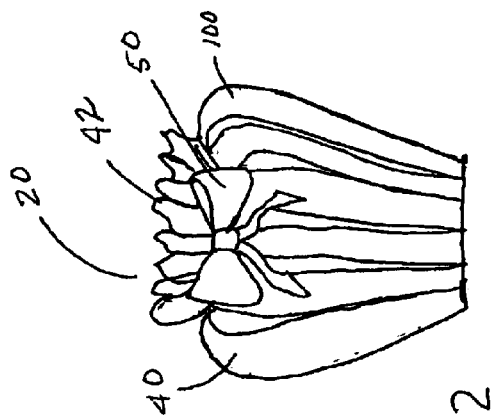
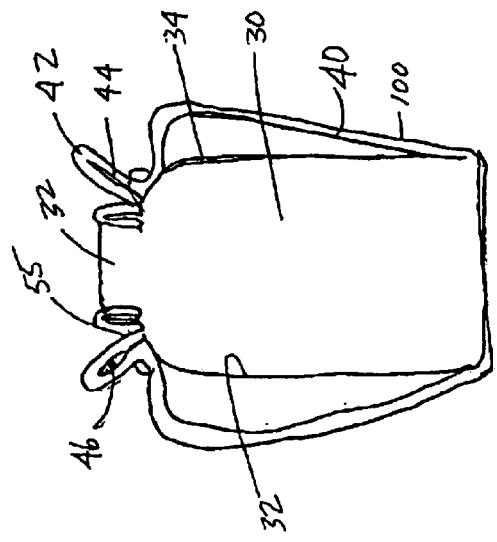
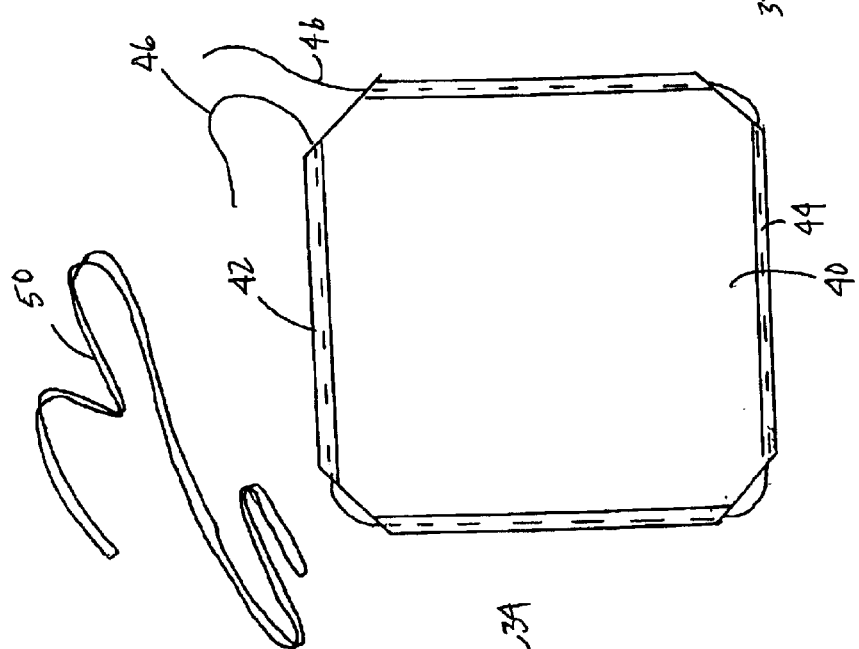
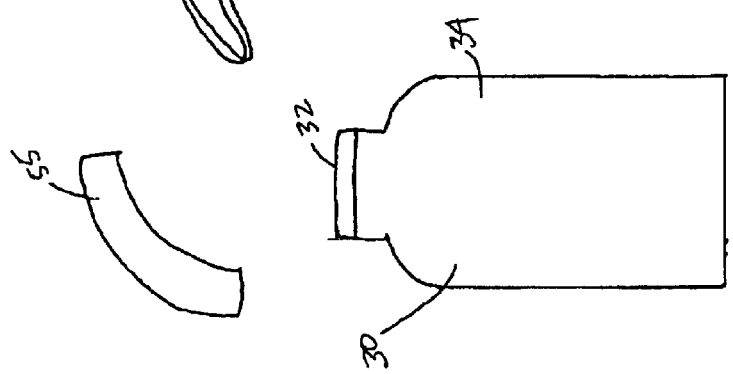
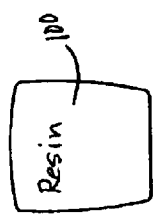
Fig. 1
Fig. 2
Fig. 3

RESIN COATED FABRIC CONTAINERS AND FURNITURE PANELS AND METHOD OF MAKING THE SAME

CROSS REFERENCE TO RELATED APPLICATIONS

None

I. BACKGROUND OF THE INVENTION

1. Field of Invention

The invention relates to a coated fabric object and a method of making the coated fabric object, including a vase, container or panel, the object having an outer fabric wrapping with a sewn seam and drawstring neck, an inner fabric ring applied and fitted to the object, after which a clear resin coating is applied to the fabric, causing the fabric to become stiff as the resin hardens, permanently bonding the fabric to the object to which it is applied.

2. Description of Prior Art

The following United States patents were discovered and are disclosed within this application for utility patent. In U.S. Pat. No. 4,405,341 to Jaschek, a coated fabric is coated with two layers of a plastic synthetic resin mixture with differing relative weights of the two layers to strengthen the fabric for durable use. A heat activated adhesive resin coating is applied to a graphite fabric is disclosed in U.S. Pat. No. 5,433,998 to Curzio.

Artwork created by applying a fiberglass material over a frame, applying a resin material to the material mixed with a hardener catalyst material forming a three-dimensional palate upon which the artistic embodiment is later applied, repeatedly further coated with additional layers of flowers, painting or lights over which more clear resin is applied, embedding the artwork within layers of the clear resin held in three-dimensional presentation. None of these prior art inventions use the process or effect the embodiment of the object of the current invention, which involves the application of a fabric to an object and applying a mixture of the disclosed resins, hardeners and catalysts comprising the process nor creating the coated fabric objects of the current invention.

II. SUMMARY OF THE INVENTION

The primary objective of the invention is to provide a decorative coated fabric object for display using a disclosed process, the objects involved being vases, urns, lamp bases and other containers, as well as furniture panels applied to furniture.

A second objective is to utilize the disclosed process to adhere fabric to the object, preserving the integrity of the fabric within multiple layers of the resin mixture composition applied to the shaped fabric, preserving the artistic shape of the fabric applied to the object.

III. DESCRIPTION OF THE DRAWINGS

The following drawings are submitted with this utility patent application.

FIG. 1 is the unassembled components of the coated fabric container.

FIG. 2 is a drawing of a coated fabric container.

FIG. 3 is a cross section of a coated fabric container.

IV. DESCRIPTION OF THE PREFERRED EMBODIMENT

Figure 5:
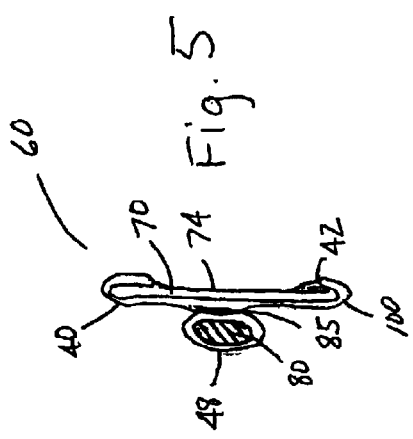
FIG. 5 is a cross sectional side view of a coated fabric furniture panel.

The invention is a resin coated fabric containers and furniture panels and a method of making the same, having a first embodiment, shown in FIGS. 1–3 of the drawings, a coated fabric container 20, comprising a container 30 having an opening 32, a segment of cloth fabric 40 conforming in size and shape to the container 30, the cloth fabric 40 having an outer perimeter 42 including a seam 44, a drawstring 46 within the seam 44 which is drawn tight gathering the cloth fabric 40 as such cloth fabric is applied to an outer surface 34 of the container 30, a fabric collar 55 adhesively applied to the opening 32 of the container 30, a ribbon 50 tied into a bow around the gathered cloth fabric at the opening 32 of the container below the seam 44, and a resin mixture 100 consisting of a polyester resin, an acrylic resin, a hardener and a catalyst, repeatedly applied to the cloth fabric and ribbon causing the cloth fabric 40 to adhere to the container 30 and harden into a permanent shape.

Figure 6:
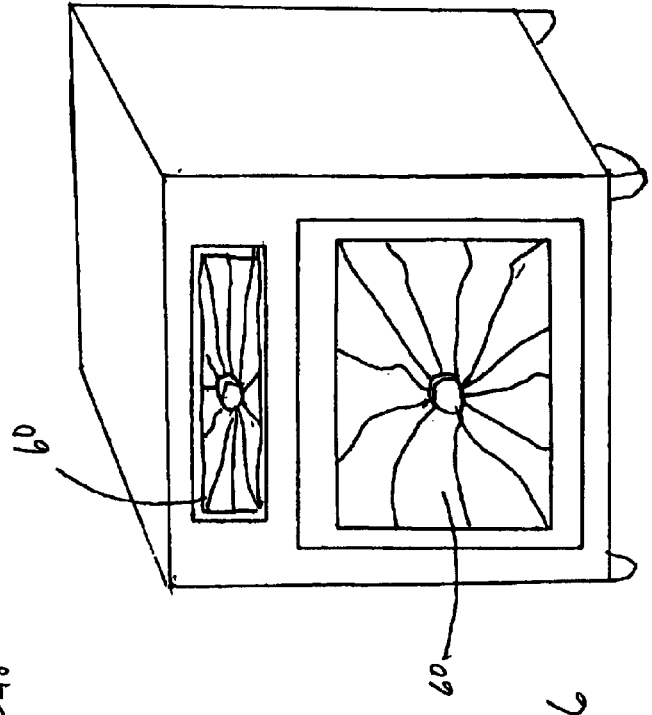
FIG. 6 is a drawing of a coated fabric furniture panel attached to a item of furniture.
Figure 4:
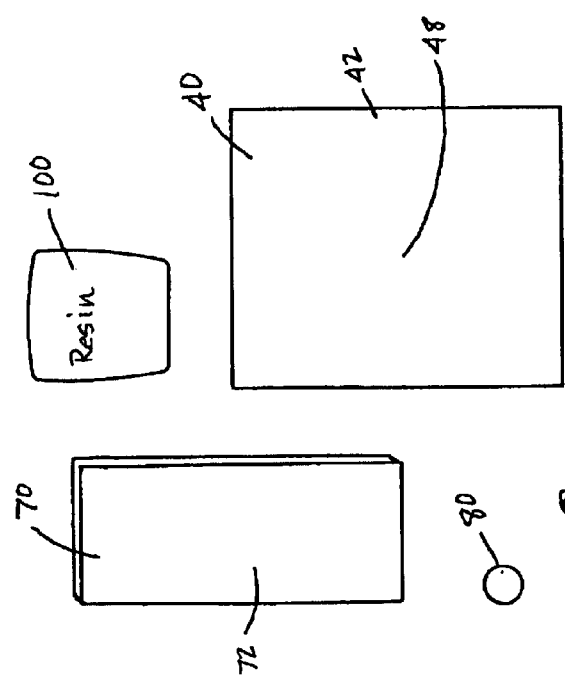
FIG. 4 is the unassembled components of furniture panel.

In a second embodiment, as shown in FIGS. 4–6 of the drawings, a coated fabric furniture panel 60 comprises a furniture panel 70 having a front surface 72 and a rear surface 74, a segment of cloth fabric 40 conforming in size and shape to the furniture panel 70, the cloth fabric 40 having an outer perimeter 42, a knob insert 80 placed within a center 48 of the cloth fabric 40 with the cloth fabric 40 gathered around the knob insert 80, a wire 85 tied around the gathered cloth fabric 40 surrounding the knob insert 80, with the center 48 of the cloth fabric 40 placed on the front surface 72 of the furniture panel 70 and the outer perimeter 42 of the cloth fabric 40 attached to the rear surface 74 of the furniture panel 70, and a resin mixture 100 consisting of a polyester resin, an acrylic resin, a hardener and a catalyst, repeatedly applied to the cloth fabric 40 causing the cloth fabric to adhere to the furniture panel 70 and harden into a permanent shape, the coated fabric furniture panel 60 then applied to an item of furniture.

In both the first and second embodiments, the preferred proportions within the resin mixture 100 consists of 80%–90% polyester resin, 10%–20% acrylic resin, 0.1%–0.3% hardener and up to 2% catalyst, with the hardener most preferably cobalt 6% napthenate and the catalyst most preferably methyl ethyl ketone peroxide. It is very important that the hardener and the catalyst are not mixed prior to addition of the polyester resin and the acrylic resin to the mixture, as the hardener and the catalyst mixed together by themselves will cause a resulting fire explosion, as the hardener and the catalyst are very unstable when mixed with each other outside the presence of the polyester resin and/or the acrylic resin. Additionally, it is preferred that the resin mixture be applied to the cloth fabric as quickly as possible, because the hardener and the catalyst, being extremely volatile, cause the resin mixture to change from a liquid to a solid substance within a matter of a very few minutes, depending on the concentrations of the hardener and the catalyst within the mixture.

The method of making the coated fabric container comprises the steps of cutting a section of a cloth fabric 40 into a size and shape suitable for covering a container 30 having an opening 32, sewing a seam 44 around an outer perimeter 42 of the cloth fabric 40 with a drawstring 46 placed within such seam 44, applying a fabric collar 55 to the opening 32 in the container 30 using an adhesive, the fabric collar 55 attaching to an inner surface 36 and an outer surface 34 on the container 30 at the opening 32, placing the container 30 on the cloth fabric 40 and reducing the seam 44 by tightening the drawstring 46, gathering the cloth fabric 40 around the opening 32 of the container completely covering the outer surface 34 of the container, positioning and shaping the cloth fabric 40 in a chosen shape and configuration about the container, placing and tying a ribbon 50 into a decorative knot around the gathered cloth fabric 40 at the opening 32 of the container 30 below the seam 44 of the cloth fabric 40, applying a resin mixture 100, comprising a polyester resin, an acrylic resin, a catalyst and a hardener, with a preferred proportionate mixture of the resin mixture consisting of 80%–90% polyester resin, 10%–20% acrylic resin, 0.1%–0.3% hardener and up to 2% catalyst, to the cloth fabric 40 in at least two layers, allowing for each layer of the resin mixture to completely dry prior to the application of the next layer, until the cloth fabric 40 is completely hard and fully retains its shape.

A method of making a coated fabric furniture panel 60 comprises the steps of cutting a section of cloth fabric 40 in proportion to the size and shape of a furniture panel 70 to which the cloth fabric 40 is to be applied, placing a knob insert 80 in a center 48 of the cloth fabric 40, gathering the center 40 of the cloth fabric around the knob insert 80, tying a wire 82 around the gathered cloth fabric 40 surrounding the knob insert 80, placing the center 48 of the cloth fabric on a front surface 72 of the furniture panel 70, attaching the outer perimeter 42 of the cloth fabric 40 to a rear surface 74 of the furniture panel 70, coating the cloth fabric 40 with multiple layers of a resin mixture 100, preferably consisting of the same proportionate ingredients as indicated above, causing the cloth fabric 40 to adhere to the furniture panel 70 and harden into a permanent shape, and attaching the coated fabric furniture panel 60 to the furniture.

While the invention has been particularly shown and described with reference to a preferred embodiment thereof, it will be understood by those skilled in the art that changes in form and detail may be made therein without departing from the spirit and scope of the invention.

What is claimed is:

1. A coated fabric container comprising:

a container having an opening;

a segment of cloth fabric conforming in size and shape to the container having an outer perimeter including a seam;

a drawstring within the seam which is drawn tight gathering the cloth fabric as such cloth fabric is applied to an outer surface of the container;

a fabric collar adhering to the opening of the container;

a ribbon tied into a bow around the gathered fabric at the opening of the container below the seam and;

a resin mixture consisting of a polyester resin, an acrylic resin, a hardener and a catalyst, repeatedly applied to the cloth fabric and ribbon causing the cloth fabric to adhere to the container and harden into a permanent shape, wherein the resin mixture consists of: 80%–90% polyester resin: 10%–20% acrylic resin, 0.1%–0.3% cobalt 6% napthenate hardener; and up to 2% methyl ethyl ketone peroxide catalyst.

* * * * *